3,206,424
PROCESS OF POLYMERIZING VINYL CHLORIDE IN THE PRESENCE OF POLYACRYLIC ACID TRIDECYL ESTER TO PRODUCE A SHOCK RESISTANT POLYMER
Erwin Heinrich, Walter Franke, Johannes Bueren, and Hans Schneider, Marl, Kreis Recklinghausen, Germany, assignors to Chemische Werke Huls Aktiengesellschaft, Marl, Kreis Recklinghausen, Germany, a corporation of Germany
No Drawing. Filed Mar. 30, 1962, Ser. No. 183,745
Claims priority, application Germany, Aug. 23, 1961, C 24,929
2 Claims. (Cl. 260—29.6)

It is known to produce shock resistant polyvinyl chloride by polymerization in aqueous suspension with the aid of suspension stabilizers and water-soluble or monomer-soluble catalysts in the presence of emulsions of polymers or copolymers which are viscous-elastic at room temperature. For this purpose emulsions or polyacrylic acid esters and in particular polyacrylic butyl and ethyl esters are suitable.

It has now been found that shock resistant polyvinyl chloride can be produced in still more advantageous manner by suspension polymerization as well as by emulsion polymerization of vinyl chloride in the presence of water-soluble or monomer-soluble catalysts by polymerizing in the presence of polyacrylic acid tridecyl ester or an emulsion of polyacrylic acid tridecyl ester. The polymer emulsion having a solids content of 20 to 50% referred to monomer, is added to the polymerization batch in quantities of 1 to 15, preferably 2 to 7% i.e. from 0.2 to 7.5% and preferably from 0.4 to 3.5% by weight of polymer. The polymerization is effected in the known manner by charging the polyacrylic acid tridecyl ester emulsion into the polymerization vessel and adding water as well as the suspension stabilizer or emulsifier dissolved therein and the oil-soluble or hydrocarbon-soluble or water-soluble initiator. After evacuation and rinsing with nitrogen, vinyl chloride is introduced into the polymerization vessel under pressure and polymerized is known manner.

By using polyacrylic acid tridecyl ester instead of the previously used polyacrylic ester of short-chained alcohols, highly notch-impact resistant shaped bodies can be produced with much smaller quantities of additions. In this way the disadvantages often necessarily resulting from the previously relatively high content of said polyacrylic acid esters of short-chained alcohols, as for example the considerable lowering of the softening point, are avoided. Furthermore, it was surprising that in particular the polyacrylic acid ester of the longer-chained and highly branched tridecyl alcohol shows a greater effectiveness than corresponding esters of short-chained, unbranched alcohols, because it was to be expected that the softening point would be lowered.

*Example 1*

Into a pressure-resistant polymerization autoclave are introduced 69,825 parts by weight of water in which are dissolved 25.8 parts by weight of gelatine, 4,594 parts by weight of a 22% polyacrylic acid tridecyl ester emulsion and 98 parts by weight of benzoyl peroxide. After rinsing with nitrogen and evacuation of the autoclave, 23,583 parts by weight of vinyl chloride are conducted into the autoclave under pressure and the resulting mixture is polymerized at 50° C. with vigorous agitation until the pressure falls. The polymerization product is filtered off, washed with water, and dried in a circulating-air drying cabinet at 50° C. It contains about 95% of polymerized vinyl chloride and 5% of the polyacrylic ester.

100 parts by weight of the polymer product, produced as described above are mixed with 1.2 parts by weight of glycerin mono-oleate, 1.2 parts by weight of a commercial lubricant, 1.2 parts by weight of stearic acid and 1.25 parts by weight of a tin stabilizer and processed to test rods according to DIN 53,453. The shock resistance is 138 cm. kg./cm.$^2$, the notch impact resistance is 61.4 cm. kg./cm.$^2$, and the softening point is 76° C.

*Example 2*

A mixture of 19,830 parts by weight of water, 135 parts by weight of sodium alkyl sulfonate (with 12 to 14 C atoms), 6,650 parts by weight of vinyl chloride, 150 parts by weight of a 23% polyacrylic acid tridecyl ester emulsion, 28 parts by weight of potassium persulfate, and 14 parts by weight of sodium pyrophosphate is polymerized with agitation at 55° C. until the pressure falls. The resulting emulsion is broken with an electrolyte (e.g. sodium chloride solution), then the polymer is filtered, washed, and dried at 50° C. in a circulating-air drying cabinet. It contains about 94 parts by weight of vinyl chloride polymer and 6 parts by weight of acrylic acid tridecyl ester polymer. As stated in Example 1, after addition of auxiliary substances the polymer is shaped into test rods, whose shock resistance is 125 cm. kg./cm.$^2$ and whose notch resistance is 61 cm. kg./cm.$^2$.

We claim:
1. Process for the production of shock resistant polyvinylchloride which comprises polymerizing vinylchloride in an aqueous dispersion containing from 0.2 to 7.5% by weight of a polyacrylic acid tridecyl ester and a polymerization catalyst.
2. Process as defined in claim 1 in which the polymerization is carried out at a temperature of about 50–55° C. and the polymerization catalyst is a member selected from the group consisting of benzoyl peroxide and potassium persulfate.

References Cited by the Examiner
UNITED STATES PATENTS
2,686,172   8/54   Wolf _____ 260—884

MURRAY TILLMAN, *Primary Examiner.*
JOSEPH R. LIBERMAN, *Examiner.*